MULTIFUNCTIONAL CIRCUIT

Filed Sept. 22, 1967 3 Sheets-Sheet 1

EXCLUSIVE-OR GATE

LINEAR AMPLIFIER

VASIL UZUNOGLU
INVENTOR

BY J. O. Tresansky
ATTORNEY

EXCLUSIVE-OR GATE

VASIL UZUNOGLU
INVENTOR

FM MODULATOR

VOLTAGE CONTROL OSCILLATOR

VASIL UZUNOGLU
INVENTOR

United States Patent Office 3,544,809

Patented Dec. 1, 1970

3,544,809

MULTIFUNCTIONAL CIRCUIT

Vasil Uzunoglu, Ellicott City, Md., assignor, by mesne assignments, to the United States of America as represented by the Secretary of the Navy Filed Sept. 22, 1967, Ser. No. 669,964
Int. Cl. H03k *19/20*
U.S. Cl. 307—216 11 Claims

ABSTRACT OF THE DISCLOSURE

The subject invention relates to a multifunctional circuit which is capable of serving as an Exclusive-OR circuit, an FM modulator, a voltage controlled oscillator and a linear amplifier, and which can easily be fabricated in the form of a monolithic semiconductor network. More particularly, the instant circuit comprises a two-transistor feedback network with a third transistor in the feedback path. When functioning as an Exclusive-OR circuit, the third transistor can be replaced by a tunnel diode connected in parallel with a resistor—the third transistor or the tunnel diode-resistor combination acting, under appropriate input conditions, to divert circuit current to ground. When functioning as an FM modulator or as a voltage controlled oscillator, the base of the third transistor is associated with an external signal source in such a manner that the resonant frequency of the circuit is controlled by adjusting the signal applied to the base of said third transistor, which, in turn, adjusts the capacitive reactance of the feedback path.

BACKGROUND OF THE INVENTION

Field of the invention

The present invention relates to a two-transistor feedback circuit having a third transistor in the feedback path. More particularly, the instant invention relates to a logic circuit having two input terminals and a single output terminal, wherein a signal appears at the output when either of the two input terminals are activated, but no signal appears at the output when both of said input terminals or neither of said input terminals are activated. Such a circuit is commonly termed an Exclusive-OR circuit. Further, the subject invention relates to circuits which are commonly termed FM modulators and voltage controlled oscillators. In these later-noted embodiments, the resonant frequency of the circuits is made to depend upon the bias impressed on the base of the third transistor, wherein variations in the resonant frequency are accomplished by varying the amplitude of the bias on said third transistor.

Description of the prior art

In the past, circuits have been designed to function as either Exclusive-OR circuits, FM modulators, voltage controlled oscillators or linear amplifiers; but on one circuit has before been designed which is capable of selectively functioning in all of these modes. Furthermore, the monofunctional circuits known to the prior art which can be used only as Exclusive-OR gates, FM modulators, voltage controlled oscillators or linear amplifiers are relatively complex in design and can not easily be fabricated in integrated circuit form.

SUMMARY OF THE INVENTION

The subject invention relates to a circuit which can alternately serve as an Exclusive-OR gate, and FM modulator, a voltage controlled oscillator and a linear amplifier, and which can readily be fabricated in the form of an integrated circuit. More particularly, the instant invention relates to a two-transistor feedback network having a third transistor in the feedback path. While the instant circuit is capable of functioning in a plurality of modes, it has a further advantage of being relatively simple in design when compared with even the single-mode circuits known to the prior art.

It is therefore an object of the invention to provide a circuit which can function in a plurality of modes.

It is a further object of the invention to provide a circuit which can selectively function as an Exclusive-OR gate, an FM modulator, a voltage controlled oscillator and a linear amplifier.

It is another object of the invention to provide a multifunctional circuit having a relatively simple design which can take the form of an integrated circuit.

It is still a further object of the invention to provide a multifunctional circuit which is small, reliable and relatively inexpensive to manufacture.

These and other objects of the invention will become more readily apparent when reference is made to the following discussion taken in conjunction with the accompanying drawings.

BRIEF DESCRIPTION OF THE DRAWINGS

FIG. 7 is a circuit schematic of a linear amplifier of the instant invention.

DESCRIPTION OF THE PREFERRED EMBODIMENTS

First, the instant invention will be discussed in terms of an Exclusive-OR gate. An Exclusive-OR gate is a circuit having a first input terminal associated with a first set of pulses A, a second input terminal associated with a second set of pulses B, and a unitary output terminal. Upon the application of either pulse A or pulse B, a response will appear at the output of said Exclusive-OR circuit; but upon the application of no pulse, or upon the application of both pulses A and B, no response will appear at the output of said circuit.

Figure 1:
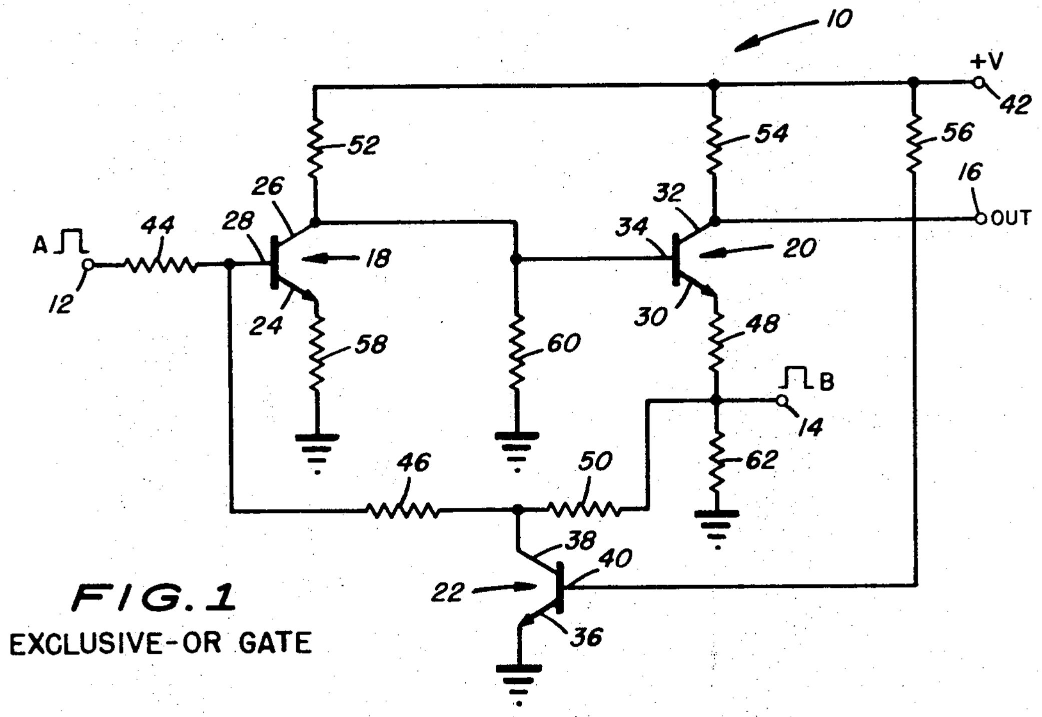
FIG. 1 is a circuit schematic of one embodiment of the Exclusive-OR gate of the instant invention.

With reference then to FIG. 1, there is first given a discussion of the components comprising a first embodiment of the subject Exclusive-OR gate, following which is given a discussion of the operation of said gate. A first embodiment of the subject Exclusive-OR gate is shown generally at 10 and comprises a first input terminal 12, a second input terminal 14, a single output terminal 16, a first main transistor 18, a second main transistor 20 and a feedback transistor 22. Comprising said first main transistor 18, is an emitter 24, a collector 26 and a base 28; comprising said second main transistor 20, is an emitter 30, a collector 32 and a base 34; and comprising said feedback transistor 22, is an emitter 36, a collector 38 and a base 40.

Providing the proper biasing for transistors 18, 20 and 22, is a first source of positive voltage pulses A, a second source of positive voltage pulses B, and a constant positive voltage source V. The pulses A are applied at the first input terminal 12; the pulses B are applied at the second input terminal 14; and the positive voltage source V is applied at a biasing terminal 42. The pulses A are impressed on the base 28 of transistor 18 through a resistor 44 and are further impressed on the collector 38 of transistor 22 through a resistor 46. The pulses B are impressed on the emitter 30 of transistor 20 through a resistor 48 and are further impressed on the collector 38 of transistor 22 through a resistor 50. The positive voltage source V reaches the collector 26 of transistor 18 via a resistor 52, reaches the collector 32 of transistor 20 via a load resistor 54, and reaches the base 40 of transistor 22 via a resistor 56. To further insure proper biasing of the three transistors, the emitter 24 of transistor 18 is connected to ground through a resistor 58, the collector 26 of transistor 18 and the base 34 of transistor 20 are connected to ground through a resistor 60, the second input terminal 14 is connected to ground through a resistor 62, and the emitter 36 of transistor 22 is connected directly to ground.

To facilitate an understanding of the operation of the Exclusive-OR gate shown in FIG. 1, the following symbols will be used to designate the various possible input conditions. $\overline{AB}$ designates the input condition when both pulses A and B are absent; $\overline{A}B$ designates the input condition when pulse A is absent and pulse B is present; $A\overline{B}$ designates the input condition when pulse A is present and pulse B is absent; and AB designates the input condition when both pulses A and B are present. And to further facilitate the understanding of the operation of the Exclusive-OR gate shown in FIG. 1, it should be noted that when both pulses A and B are absent ($\overline{AB}$), transistors 18 and 22 are nonconductive while transistor 20 is conductive.

The operation of the Exclusive-OR gate will now be discussed, first with reference to the $\overline{AB}$ input conditions. As has already been noted, the circuit parameters are chosen so that transistors 18 and 22 are nonconductive and transistor 20 is conductive under this condition. Thereore, the positive supply voltage V which is impressed upon terminal 42 causes a voltage drop to appear across resistor 54 since conductive transistor 20 allows current to flow therethrough. The voltage drop across resistor 54 is considerable, and therefore the output signal which appears at output terminal 16 is small.

Under the input condition $\overline{A}B$, pulse B causes transistor 18 to become conductive by increasing the voltage on base 28, and further causes transistor 20 to become nonconductive by both increasing the voltage on the emitter 30 and by causing the bias on base 34 to decrease (due to a voltage drop across resistor 52). Therefore, with transistor 18 conductive and transistor 20 nonconductive, the voltage at the collector 32 of transistor 20 is equal to the positive supply voltage V since no current flows through resistor 54. Since the voltage on the collector 32 of transistor 20 appears at output terminal 16, and since the voltage at the collector 32 is equal to the positive supply voltage V, an output appears at the output terminal 16 which is large when compared with the output under the $\overline{AB}$ condition discussed above.

Under the input condition $A\overline{B}$, pulse A causes transistor 18 to become conductive and causes transistor 20 to become nonconductive since pulse A causes a voltage increase on the base 28 of transistor 18 and on the emitter 30 of transistor 20 and causes a decrease in voltage at the base 34 of transistor 20 (due to a voltage drop across resistor 52). Since transistor 18 is rendered conductive and transistor 20 is rendered nonconductive, the voltage at the collector 32 of transistor 20 is equal to the positive supply voltage V since no current flows through resistor 54. Therefore, the voltage at the output terminal 16, which is the same as the voltage on the collector 32, is equal to the supply voltage V, just as in the $\overline{A}B$ input condition discussed above.

Figure 2:
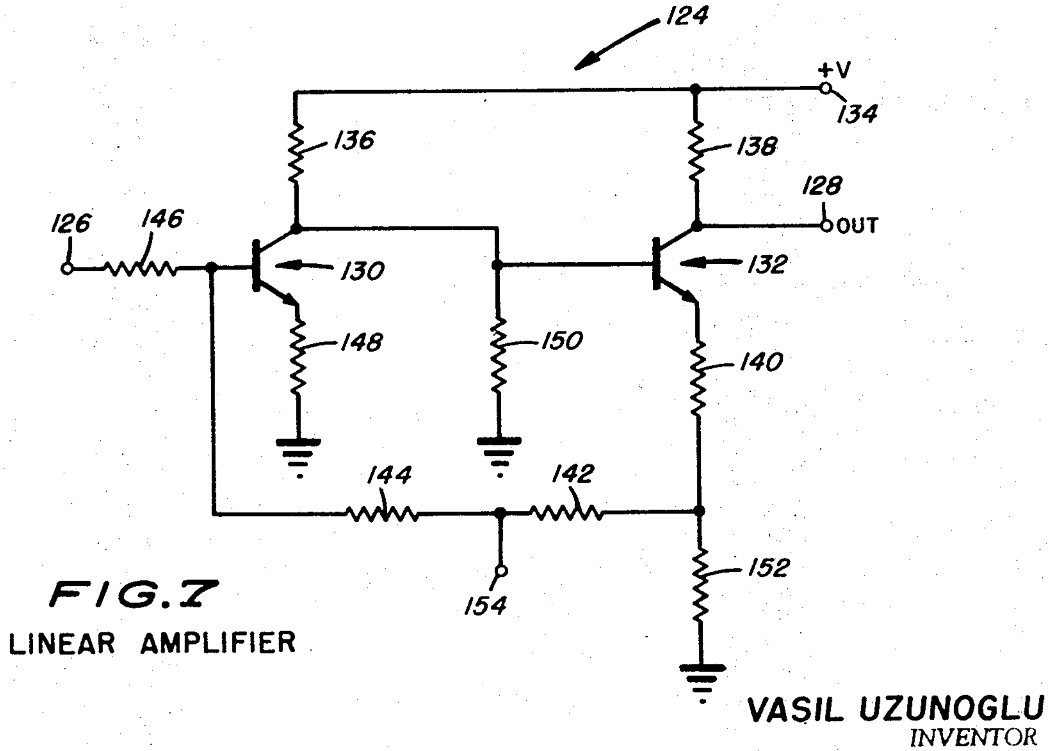
FIG. 2 is a graph of the collector current plotted against the collector-to-emitter voltage of the feedback transistor shown in the schematic of FIG. 1.

Before an explanation of the circuit operation under the input condition AB is undertaken, reference is directed to FIG. 2. in this figure, there is shown a graph of the collector current plotted against the collector-to-emitter voltage feedback transistor 22. The characteristic curve of transistor 22 is shown at 64; the load line under $\overline{A}B$ or $A\overline{B}$ input conditions is shown at 66; and the load line under AB input condition is shown at 68. Under the $\overline{A}B$ or the $A\overline{B}$ input conditions, the load line 66 crosses the characteristic curve 64 to 70. At crossing 70, it is evident that the slope of the characteristic curve is such that a large change in voltage corresponds to a small change in current, making the effective collector-to-emitter resistance of transistor 22 large. On the other hand, under the AB input condition the load line 68 crosses the characteristic curve 64 at 72; and at crossing 72, the slope of the characteristic curve 64 is such that a small change in voltage coresponds to a relatively large change in current, making the effective collector-to-emitter resistance of transistor 22 small. In summation, when pulse A or pulse B is on, the effective resistance introduced into the feedback path by transistor 22 is large; but when pulses A and B are both on, the effective resistance introduced into the feedback path by transistor 22 is small.

In operation then, under the AB input condition, transistor 22 becomes conductive, and hence neither transistor 18 nor transistor 20 is affected by the pulses since both pulses A and B are bypassed to ground through the low impedance path formed by transistor 22 and the parallel connection of resistors 46 and 50. Therefore, transistor 18 is nonconductive and transistor 20 is conductive, just as is the case under the $\overline{AB}$ input condition, and a low output voltage appears at terminal 16 since the current flowing through transistor 20 causes a large voltage drop across resistor 54.

In summation, under the input conditions $\overline{AB}$ or AB, transistor 20 is rendered conductive causing a voltage drop to occur across resistor 54 and thereby causing the output appearing at terminal 16 to be low; and under the input conditions $\overline{A}B$ or $A\overline{B}$, transistor 20 is rendered nonconductive allowing the full value of the positive supply voltage V to appear at output terminals 16. Therefore, the criteria for an Exclusive-OR circuit are completely met by the circuit shown in FIG. 1.

Figure 3:
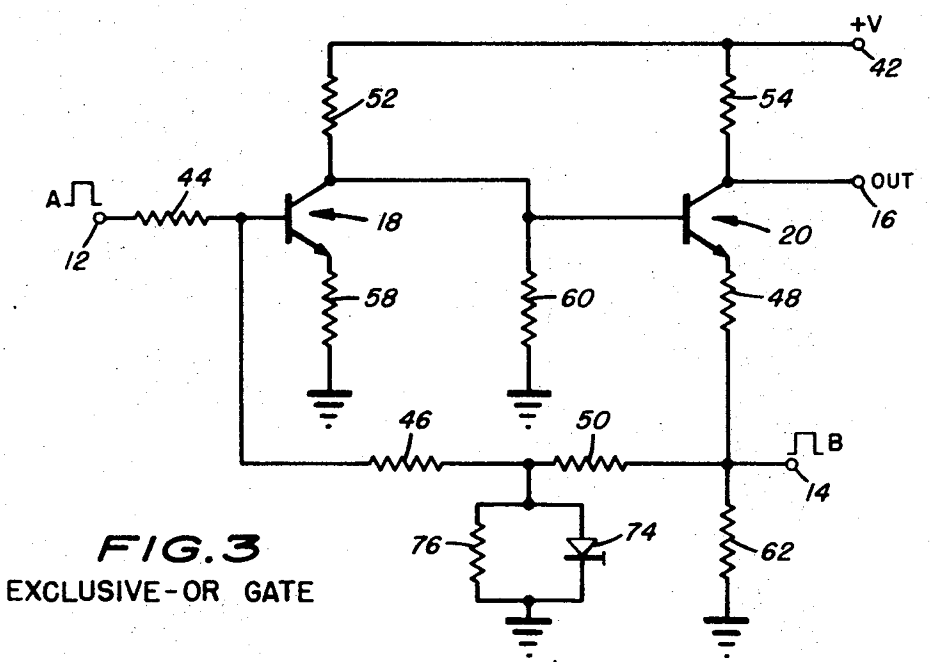
FIG. 3 is a circuit diagram of an alternate embodiment of the Exclusive-OR gate of the subject invention.
Figures 2, 4:
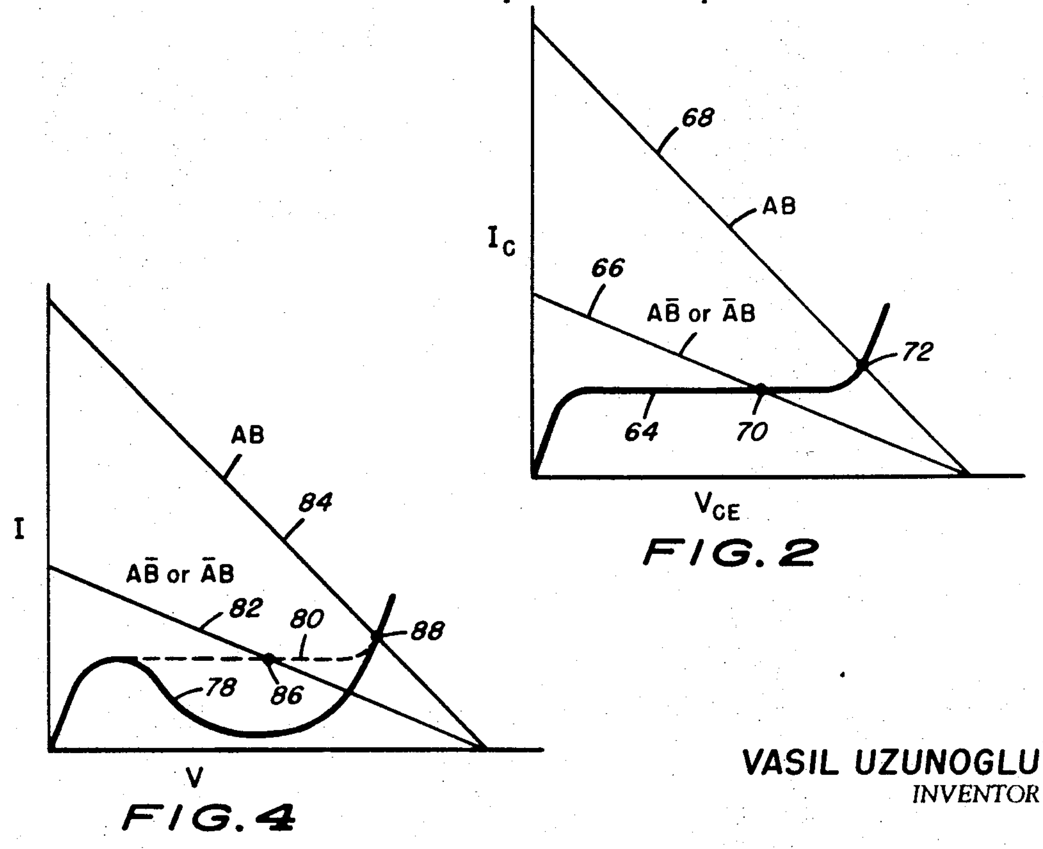
FIG. 4 is a graph of the voltage-current characteristics of the tunnel diode-resistor combination shown in the schematic of FIG. 3.

With reference now to FIGS. 3 and 4, a second embodiment of an Exclusive-OR gate of the instant invention will be discussed. The Exclusive-OR gate shown in FIG. 3 differs from that shown in FIG. 1 only in that transistor 22 of FIG. 1 is replaced by a tunnel diode connected in parallel with a resistor. Due to the similarities between the OR gate of FIG. 1 and the OR gate of FIG. 3, corresponding elements are similarly referenced and a detailed discussion of the operation of the circuit shown in FIG. 3 is omitted.

Since the transistor 22 of the Exclusive-OR gate shown in FIG. 1 serves only as a variable resistor—the resistance of transistor 22 alternating between a high value when one input pulse is applied and a low value when no input pulses are applied or when both input pulses are applied—it is obvious that transistor 22 can be replaced by any element or combination of elements which exhibit similar resistance characteristics. Therefore, referring to FIG. 3, the feedback transistor of FIG. 1 is replaced by a tunnel diode 74 connected in a parallel relationship with a resistor 76. How the tunnel diode 74 connected in parallel with the resistor 76 functions as does transistor 22 of FIG. 1 will become evident when reference is made to FIG. 4.

In FIG. 4 there is shown a curve of the voltage versus current characteristics of the tunnel diode-resistor combination of FIG. 3. The characteristic curve of the tunnel diode alone is shown at 78; and the composite curve of the tunnel diode connected in parallel with the resistor is shown in dotted lines at 80. Similar to the load lines shown in FIG. 2, the load line for the $\overline{A}B$ or the $A\overline{B}$ input conditions is shown at 82; and the load line for the AB input condition is shown at 84. Therefore, when the load line 82 crosses the composite curve 80 (at 86), the effective resistance of the tunnel diode-resistor combination is large; but when the load line 84 crosses the composite curve 80 (at 88), the effective resistance of the combination is small. It therefore becomes evident that the transistor 22 shown in FIG. 1 can be replaced by a tunnel diode 74 connected in parallel with a resistor 76, as shown in FIG. 3, without detracting from the operation of the Exclusive-OR gate.

During the development of the Exclusive-OR gates discussed above it was discovered that the basic circuit shown in FIG. 1 can function also as an FM modulator, a voltage controlled oscillator and a linear amplifier by merely adding or removing particular elements of the basic circuit. Naturally, when the basic circuit of FIG. 1 is put into integrated form, to change the operation, one does not chip out a particular element, but merely allows the element connection to "float."

Figure 5:
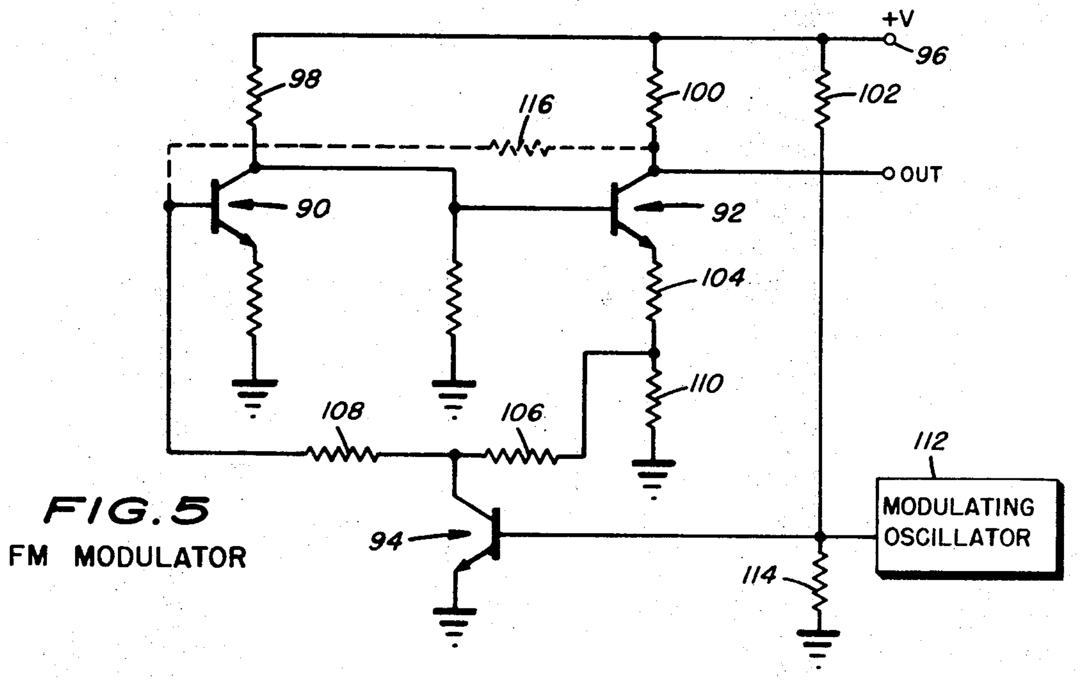
FIG. 5 is a circuit schematic of an FM modulator of the instant invention.

With reference to FIG. 5, there is shown a circuit schematic of an FM modulator. The FM modulator comprises a first main transistor 90, a second main transistor 92 and a feedback transistor 94. Associated with the three transistors is a positive supply voltage V applied at a bias terminal 96. The supply voltage V biases the collector of transistor 90 through a resistor 98, biases the collector of transistor 92 through a resistor 100, and biases the base of transistor 94 through a resistor 102. Coupling together the emitter of transistor 92 and the base of transistor 90, are resistors 104, 106 and 108, respectively. Connected intermediate resistor 106 and resistor 108, and capable of drawing circuit current therefrom, is the collector of transistor 94; and connected intermediate nesistor 104 and resistor 106 is one terminal of a resistor 110, the other terminal of which is connected to ground. Connected directly to the base of transistor 94 is a modulating oscillator 112 and one terminal of a resistor 114, the other terminal of which is connected to ground. In addition to the feedback path provided by transistor 94, there exists a second feedback path which is due to a feedback caused by the inherent interaction between successive amplifier stages. This second inherent feedback is represented, in dotted lines, by resistor 116.

In operation, the FM modulator shown in FIG. 5 is a circuit which oscillates at a given bias supply voltage V. Once the oscillations are achieved, it is possible to change the frequency of oscillation by changing the amount of feedback associated with the circuit; and the manner in which the circuit feedback is controlled is by varying the bias which appears on the base of transistor 94. That a changing bias on transistor 94 causes a corresponding change in the frequency of oscillation of the total circuit becomes readily apparent when one notes that the bias on the base of a transistor determines the effective capacitance between the collector and the emitter of said transistor. Therefore, variations in the output of the modulating oscillator 112 causes corresponding variations in the resonant frequency of the total circuit by causing changes in the collector-to-emitter capacitance of the feedback transistor 94. In testing the FM modulator of FIG. 5, it has been observed that a 0.4 volt change in the base voltage of transistor 94 causes the resonant frequency of the circuit to decrease from 10 mHz. to 3.5 mHz.

It should here be noted that the FM modulator shown in FIG. 5 can serve as other than an FM modulator. For example, the circuit can be used as a video amplifier by merely altering the bias supply voltage; the circuit can be used in chirp radar systems if the frequency of oscillation is made to change linearly with time; and the circuit can further be used as a sensing circuit since any impedance variation in the feedback path will be reflected as a variation in the oscillation frequency. Furthermore, by performing only minor alterations on the FIG. 5 modulator, the circuit becomes a voltage controlled oscillator. More particularly, the circuit of FIG. 5 becomes a voltage controlled oscillator when resistors 102 and 114 are made variable.

Figure 6:
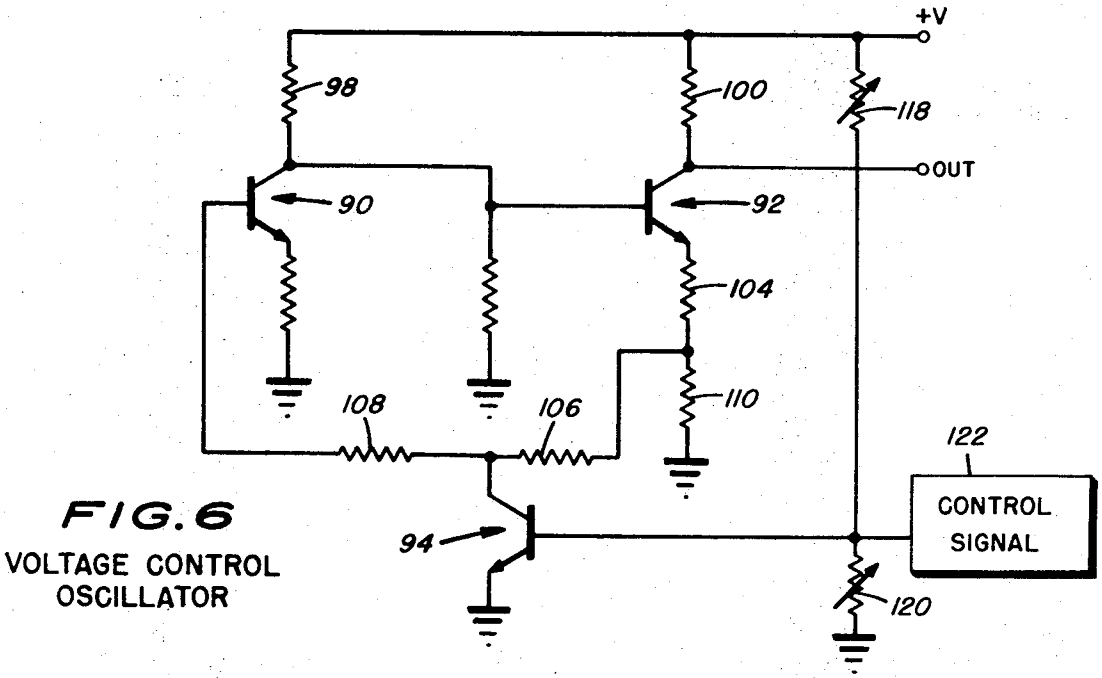
FIG. 6 is a circuit diagram of a voltage controlled oscillator of the instant invention.

Referring then, to FIG. 6, there is shown a voltage controlled oscillator (the FM modulator of FIG. 5 after incorporating the above-noted alterations). Due to the similarities between the FM modulator of FIG. 5 and the voltage controlled oscillator of FIG. 6, corresponding elements are similarly numbered and only the modifications are discussed. Whereas the FM modulator of FIG. 5 comprises a fixed resistor 102 and a fixed resistor 114, the voltage controlled oscillator of FIG. 6 comprises a variable resistor 118 and a variable resistor 120, said variable resistors replacing fixed resistors 102 and 114 of FIG. 5, respectively. Furthermore, the modulating oscillator 112 of FIG. 5 is replaced by a control signal source 122 which can be in the form of any AC signal.

The operation of the voltage controlled oscillator of FIG. 6 is similar to the operation of the FIG. 5 FM modulator. A signal emergent from the control signal source 122 is impresed on the base of feedback transistor 94; and the effective capacitance associated with the feedback transistor is regulated by variable resistor 120 while the amount of feedback in the circuit is further regulated by variable resistor 118. Therefore, by adjusting the value of resistors 118 and 120, the oscillation frequency of the voltage controlled oscillator shown in FIG. 6 can be varied.

Experiments have shown that the voltage controlled oscillator of FIG. 6 exhibits a much improved signal-to-noise ratio when compared with voltage controlled oscillators of the prior art. Due to the improved signal-to-noise ratio, the subject oscillator proves to be especially useful in applications such as satellite tracking wherein the tracking system employs phase lock loops.

In addition to the uses of the subject circuits which are outlined above, it has been found that by allowing the feedback transistor and the second input terminal of the exclusive OR gate shown in FIG. 1 to "float," the resultant circuit is a linear amplifier which, in many respects, is a refinement when compared with those amplifiers known to the prior art. More particularly, the resultant linear amplifier exhibits a much improved gain-bandwidth product and further exhibits improved operating characteristics under widely varied temperature conditions. Furthermore, the resultant linear amplifier is quite easily adaptable to microcircuitry.

Referring then to FIG. 7, the linear amplifier of the subject invention is shown generally at 124 and has an input terminal 126 and an output termnal 128. The linear amplifier is a feedback pair amplifier comprising a first transistor 130 and a second transistor 132. Providing a bias voltage for the two transistors is a positive supply voltage V which is impressed on the amplifier at bias terminal 134. The bais supply voltage V biases the collector of transistor 130 through a resistor 136 and biases the collector of transistor 132 through a resistor 138. A feedback path between the emitter of transistor 132 and the base of transistor 130 comprises resistors 140, 142 and 144. The circuit of the instant amplifier is further provided with a resistor 146 connected between the input terminal 126 and the base of transistor 130, a resistor 148 connected between the emitter of transistor 130 and ground, a resistor 150 connecting the collector of transistor 130 and the base of transistor 132 to ground, and a resistor 152 connecting the common point between resistors 140 and 142 to ground. It should be noted that intermediate resistors 142 and 144 is a "floating" terminal 154. This terminal is shown since it is present when the basic circuit is put into integrated circuit form, said terminal serving as a connection for a transistor or a tunnel diode when the basic circuit is used as an Exclusive-OR gate, an FM modulator or a voltage controlled oscillator.

In conclusion, there has been disclosed a circuit which can be fabricated in integrated circuit form and which, with mnior alterations, can function as an Exclusive-OR gate, an FM modualtor, a voltage controlled oscillator and a linear amplifier. The circuit, in its most complicated form, comprises a two-transistor feedback network with a third transistor in the feedback path and which further comprises first and second input terminals and a single output terminal; and the circuit, in its simplest form, comprises a two-transistor feedback network with a single input and a single output. Since the instant invention comprises a circuit which, with minor alterations can perform a plurality of operations, it is obvious that the basic circuit can be manufactured as an integrated circuit and can be easily adapted for the addition of auxiliary elements which form part of the most complex circuit.

It is to be understood that the above-described embodiments and configurations are only illustrative of the applications and principles of the instant invention, and that numerous other embodiments and configurations may be devised by those skilled in the art without departing from the spirit and scope of the invention.

I claim:

1. An electronic circuit comprising
a first input terminal;
a second input terminal;
an output terminal;
first signal means for supplying said first input terminal with a series of voltage pulses;
second signal means for supplying said second input terminal with a series of voltage pulses;
first switching means (20) for conducting circuit current
when no voltage pulses are being applied by either said first or said second signal means and
when voltage pulses are being applied by both said first and said second signal means,
and for blocking circuit current
when voltage pulses are being applied by only said first signal means and
when voltage pulses are being applied by only said second signal means;
second switching means (18) for rendering said first switching means nonconductive
when voltage pulses are being applied by only said first signal means and
when voltage pulses are being applied by only said second signal means;
third switching means responsive to said first and second signal means in such a manner as to provide a low impedance, shunting path between said second switching means and ground only under the condition when voltage pulses are being applied to both said first and said second input terminals or under the condition when voltage pulses are being applied to neither said first nor said second input terminals and further said third switching means providing a high impedance, non-shunting path between said second switching means and ground under the condition when voltage pulses are being applied to either said first or said second input terminals; and
load means (54) associated with said output terminal for causing a large output response to appear at said output terminal when said first switching means blocks circuit current and for causing a small output response to appear at said output terminal when said first switching means conducts circuit current;
whereby a large output response is made to appear at the output terminal
when voltage pulses are being applied by only said first signals and
when voltage pulses are being applied by only said second signal means and
whereby a small output response is made to appear at the output terminal when no voltage pulses are being applied by either said first or said second signal means, and
when voltage pulses are being applied by both said first and said second signal means.

2. The circuit of claim 1 wherein said first and second switching means are transistors.

3. The circuit of claim 1 wherein said voltage pulses of said first and second signal means are of a positive potential.

4. The circuit of claim 2 wherein said third switching means is a device which exhibits a large impedance when biased by only one of said first and said second signal means but which exhibits a small impedance when biased by both said first and said second signal means.

5. The circuit of claim 4 wherein said third switching means is a transistor.

6. The circuit of claim 4 wherein said third switching means is a tunnel diode connected in parallel with a resistor.

7. An electronic circuit comprising
a first main transistor (18) having a base, a collector and an emitter;
a second main transistors (20) having a base; a collector and an emitter;
feedback switching means;
a first input terminal associated with the base of said first main transistor and with said feedback switching means;
a second input terminal associated with the base of said first main transistor and with said feedback switching means;
an output terminal;
first signal means for supplying said first input terminal with a voltage;
a second signal means for supplying said second input terminal with a voltage;
a bias supply associated with the collector terminals of said first and said second main transistors for supplying bias thereto; and
means responsive to the conductivity of said second main transistor for causing a large voltage to appear at said output terminal when said second main transistor is nonconductive and for causing a small voltage to appear at said output terminal when said second main transistor is conductive;
wherein the collector of said first main transistor is connected to the base of said second main transistor in such a manner that the conductivity of said first main transistor effects the conductivity of said second main transistor;
wherein the feedback switching means exhibits a low impedance when both said first and said second signal means are supplying voltages to said input means, but exhibits a high impedance under all other input conditions; and
wherein said feedback switching means is connected to said first and said second input terminals in such a manner that when said feedback switching means exhibits a low impedance, said first and said second signal means are shorted to ground;
whereby a large output response is made to appear at said output terminal exclusively under the input conditions when only said first signal means is supplying a voltage to said first input terminal or when only said second signal means is supplying a voltage to said second input terminal.

8. The circuit of claim 7 wherein said feedback switching means comprises a transistor whose collector is associated with said first and said second input terminals.

9. The circuit of claim 7 wherein said feedback switching means comprises a tunnel diode connected in parallel with a resistor.

10. The circuit of claim 7 wherein the outputs of said first and second signal means are positive voltage pulses.

11. The circuit of claim 7 wherein the output of said bias supply is voltage pulses having a positive potential.

References Cited

UNITED STATES PATENTS

| | | | |
|---|---|---|---|
| 3,093,751 | 6/1963 | Williamson | 307—216 |
| 3,210,568 | 10/1965 | Dunnet | 307—216 |
| 3,309,531 | 3/1967 | Hearn | 307—216 |
| 3,317,721 | 5/1967 | Derlind | 307—216 |

OTHER REFERENCES

Greenholgh, IBM. tech. disclosure bull., Exclusive OR Circuit, April 1960, vol. 2, No. 6, pp. 98 and 99.

DONALD D. FORRER, Primary Examiner

D. M. CARTER, Assistant Examiner

U.S. Cl. X.R.

307—206; 328—93; 330—26; 331—108; 332—16